Figure 1:
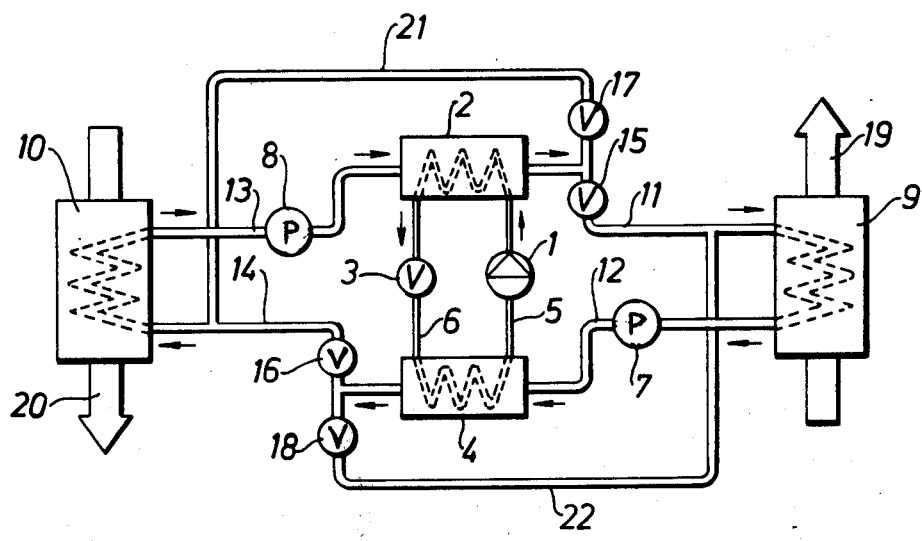

United States Patent [19]

Ljung

[11] 4,061,186
[45] Dec. 6, 1977

[54] COMBINED COOLING AND HEAT RECOVERY SYSTEM

[75] Inventor: Ake Ljung, Soderkoping, Sweden

[73] Assignee: AB Svenska Flaktfabriken, Stockholm, Sweden

[21] Appl. No.: 665,545

[22] Filed: Mar. 10, 1976

[30] Foreign Application Priority Data

Mar. 21, 1975 Sweden .............................. 75033142

[51] Int. Cl.² .......................... F24F 7/00; F24J 3/04; F28D 15/00; F28F 27/02
[52] U.S. Cl. ........................................ 165/59; 165/62; 165/66; 165/101; 165/103; 165/107; 165/DIG. 12
[58] Field of Search ................... 165/DIG. 12, 59, 62, 165/66, 107, 101, 103

[56] References Cited

U.S. PATENT DOCUMENTS

| | | | |
|---|---|---|---|
| 2,044,951 | 6/1936 | Munters | 62/79 |
| 2,677,243 | 5/1954 | Telkes | 165/62 X |
| 2,847,190 | 8/1958 | Slattery et al. | 165/62 X |
| 3,135,318 | 6/1964 | Carleton | 165/62 X |
| 3,623,549 | 11/1971 | Smith, Jr. | 165/66 X |
| 3,902,546 | 9/1975 | Linhardt et al. | 165/62 X |
| 3,935,899 | 2/1976 | Jolly | 165/62 X |
| 3,952,947 | 4/1976 | Saunders | 237/1 A |
| 3,968,833 | 7/1976 | Strindehag et al. | 165/66 |
| 3,996,759 | 12/1976 | Meckler | 165/62 |

*Primary Examiner*—Carroll B. Dority, Jr.
*Assistant Examiner*—Sheldon Richter
*Attorney, Agent, or Firm*—Dorfman, Herrell and Skillman

[57] ABSTRACT

A ventilating system which affords recuperative heat exchange between the supply air and the spent air and which incorporates a refrigerating machine as a heat pump which may be operated either to supplement the recuperative heat exchange or to cool the supply air without recuperative heat exchange between the supply air and the spent air. The system includes a heat exchanger in the supply-air duct and a second heat exchanger in the spent-air duct. The two heat exchangers are interconnected in a fluid circuit so that during the heating season, the fluid is heated by the spent air to warm the supply air. When the refrigerating machine is operting as a heat pump, the fluid discharged from the supply-air heat exchanger is passed through the evaporator and the fluid passing from the spent-air exchanger to the supply-air exchanger is passed through the condenser. In the cooling season, the fluid circuit circulates the fluid in the supply air through the evaporator and the spent-air heat exchanger is connected to the condenser. This system may also supplement the supplied air with recirculated spent air, or may supplement the spent air with fresh outside air.

5 Claims, 3 Drawing Figures

COMBINED COOLING AND HEAT RECOVERY SYSTEM

This invention relates to a combined cooling and heat recovery system.

In air-conditioning installations it is normal procedure that the outside air to be supplied to a room normally is cooled in summer-time and heated in winter-time. This cooling and heating of the outside air constitutes in many cases a substantial part of the total energy consumption in the building. It is usually now tried, therefore, to recover a part of the energy supplied which otherwise to a large extent would escape with the outgoing spent air. Particularly in zones of cold climate, therefore, a heat recovery unit of some kind is now almost always positioned in the spent air flow.

The present invention relates to a system for cooling and heating outside air which compared with conventional systems appreciably reduces the energy consumption during the year. At the same time installation costs are reduced substantially compared with other energy-saving cooling and heating systems. The economically favourable circumstance of reduced installation costs as well as operation costs, moreover, is attained in a simple way by utilizing a special combination of conventional components and apparatuses.

Attempts have been made also in conventional cooling and heating systems to combine the components comprised therein, because it is unfavourable to apply separate cooling units, air-heaters and heat recovery units in view of the high installation costs and the large pressure drops in the flows of supply air and spent air. The only heat recovery units adapted for combination with a cooling unit are the so-called fluid-coupled heat recovery units, because they operate like the cooling units with heat exchangers in the form of laminated batteries or the like. It, therefore, happens that at cooling in summer-time the laminated batteries are utilized which in winter-time are comprised in the heat recovery unit. However, the advantages of a combined system can fully be utilized only when the refrigerating machine in winter-time operates as heat pump, which is possible in the system described in the following.

The cooling and heat recovery system according to the invention comprises a combined heat pump and heat recovery system, which by simple valve arrangements can be coupled for cooling in summer-time and for heating in winter-time. The heat recovery system in its simplest design comprises two laminated batteries, one positioned in the supply air flow and one in the spent air flow, between which batteries a liquid, for example a water-glycol mixture circulates. The laminated batteries are utilized in winter-time also for increasing the heat, which is delivered to the supply air flow and, respectively, the heat, which is removed with the spent air flow, by means of the refrigerating machine via the fluid circuit. In summer-time, the same laminated batteries are used to cool the supply air flow and, respectively, to remove heat via the spent air flow by means of the refrigerating machine via the fluid circuit. It is apparent also from the aforesaid that the installation costs can be held low by utilizing the same components for several purposes. The low energy consumption of the combined cooling and heat recovery system is evident from the heat-technical analysis presented below. A contributing factor to the low operation costs, as already pointed out, is also the fact that the pressure drops on the supply air side and spent air side are comparatively low, because the same heat exchanger is used for cooling as well as heating and heat recovery.

Figure 2:
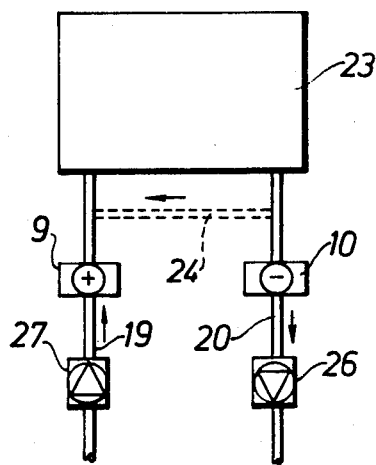
Figure 3:
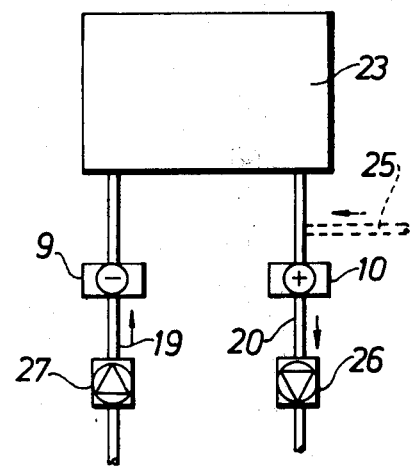

The invention is described in greater detail in the following, with reference to the accompanying drawings, in which FIG. 1 shows the coupling of the system, FIG. 2 shows the connection of the system to an air-conditioning installation at heating, FIG. 3 shows the connection of the system to an air-conditioning installation at cooling.

From FIG. 1 is apparent how the cooling and heating system simultaneously is used as heat pump and heat recovery unit in winter-time. The valves 15 and 16 are presupposed to be open, and the valves 17 and 18 be closed. The cooling installation in this case comprises the compressor 1, the condenser 2, the throttle-valve 3 and the evaporator 4. These components together with the pipes 5 and 6 form a primary circuit, through which a coolant circulates. The condenser 2 and evaporator 4 are designed as heat exchangers, and by means of the pumps 7 and 8 a water-glycol mixture, for example, is pumped about in the secondary circuit formed by the condenser 2, the supply air battery 9, the evaporator 4, the spent air battery 10 and the pipes 11, 12, 13 and 14. At this operation case the supply air flow 19 is heated while the spent air flow 20 is cooled. The supply air flow is heated both by means of the effect transferred by heat recovery in the secondary circuit and the additional effect added by the refrigerating machine operating as heat pump. For this reason, the supply air is heated more than at a pure heat pump operation or when only heat recovery is utilized (see below). It is to be observed that the refrigerating machine need not be started during the intermediate seasons when only a limited heating effect is required.

The coupling of the combined cooling and heat recovery system in summer-time appears also from FIG. 1 where the valves 17 and 18 are presupposed being open, and the valves 15 and 16 closed. The supply air 19 is cooled thereby that the water-glycol mixture by means of the pump 7 is pumped about in the secondary circuit formed by the evaporator 4, the pipes 7 and 22 and the supply air battery 9. In an analog manner heat is removed with the spent air flow 20 thereby that a water-glycol mixture is pumped about by means of the pump 8 in the secondary circuit formed by the condenser 2, the pipes 8 and 21 and the spent air battery 10.

The connection of the cooling and heat recovery system into an air-conditioning installation appears from FIGS. 2 and 3. In FIG. 2 an example is shown how the system can be connected in winter-time to a room 23. The air is supplied to the room by means of the supply air fan 27 and is removed by means of the spent air fan 26. Only the supply air battery 9 and the spent air battery 10 of the cooling and heating system are shown in the drawing. 19 designates, as previously, the supply air flow, and 20 the spent air flow. These air flows can be permitted to directly pass into the room and, respectively, out therefrom, but in many cases it can be advantageous to utilize a certain amount of return air, which is recirculated through the room. The return air flow 24 can be larger or smaller than the supply air flow 19 and the spent air flow 20. The supply air flow 19 normally consists of outside air, which before or after the heat exchanger can additionally be treated, for example purified, moistened or dehumidified. In FIG. 3 a corresponding coupling for cooling in summer-time is shown. Also in this case a certain amount of return air can be recirculated, which then usually is supplied before the supply air battery 9. When the spent air flow from the room provides an insufficient cooling effect, the air flow through the spent air battery 10 can be increased by passing also an outside air flow 25 through this battery. In cases when the temperature of the outside air is lower than the temperature of the spent air, it also is usual to utilize only outside air instead of spent air.

The advantages of the combined cooling and heating system with respect to operation economy compared with conventional systems become apparent from the below calculation example, the result of which has been computed by data program. The following prerequisites are assumed to apply:

1. Temperature of the spent air = 22° C.
2. The relative humidity of the spent air is so low that condensate does not precipitate in the spent air battery 10.
3. The stroke volume of the compressor = 4.5 dm$^3$/kg of the spent air flow 20.
4. For all heat exchangers (the product of the heat transmission coefficient $k$ and the heat area F) kF is 2.6 times the heat capacity flow (W/° C) for the spent air flow 20.
5. The return air flow is twice as great as the spent air flow 20.
6. For the conventional heat pump the supply air flow 19 is three times greater than the spent air flow 20 and consists to one third of outside air and to two thirds of return air.
7. For the combined cooling and heating system the supply air flow 19 is as great as the spent air flow 20 and consists only of outside air (FIG. 2).

On the basis of these prerequisites, the heating effect of the cooling and heat recovery system according to the invention has been compared with conventional systems. The calculation has been made, as appears from the listed prerequisites, for a conventional fluid-coupled heat recovery unit with heat exchangers of a size equal to that in the new system, and for a conventional heat pump, which also has heat exchangers of a size equal to that in the new system.

In the Table below the calculations for some different temperatures (between −30° and 0° C) of the outside air are shown. The results in the different cases are indicated as the temperature of the supply air after the supply air battery and admixture of return air, here called final temperature.

| System | Final temperature (° C) | | | | | | |
|---|---|---|---|---|---|---|---|
| | −30 | −25 | −20 | −15 | −10 | −5 | 0 |
| Conventional fluid-coupled heat recovery unit | 14.5 | 15.2 | 15.9 | 16.6 | 17.3 | 18.0 | 18.7 |
| Conventional heat pump | 10.8 | 12.5 | 14.2 | 15.9 | 17.6 | 19.3 | 21.0 |
| Combined cooling and heating system | 16.0 | 17.0 | 18.0 | 19.0 | 20.0 | 21.0 | 22.0 |

As is evident from this Table, at all outside temperatures between −30° C and 0° C the distinctively greatest increase in temperature of the supply air is obtained when the combined cooling and heating system according to the invention is utilized.

I claim:

1. A system for cooling and heating ventilation air flowing through supply-air ducts and spent-air ducts comprising a heat exchanger in each of said ducts, fluid circuit means interconnecting said heat exchangers, said fluid circuit means including a refrigerating machine having an evaporator component connected to one of the heat exchangers and a condenser component connected to the other heat exchanger, said components operable respectively, when said machine is operating, to cool and to heat the fluid passing therethrough, and valve means connected to each component to alternatively direct the fluid from said component either back through the associated heat exchanger or to the other heat exchanger, whereby when said valve means is in the first position heat is transferred from the supplied air to the evaporator by said one heat exchanger, and is transferred from said condenser to spent air by said other heat exchanger, and when said valve means is in the second position heat is transferred between the supplied air and the spent air by the heat exchangers and said fluid circuit.

2. A system according to claim 1 wherein said circuit means includes pump means for each heat exchanger operable to pump the fluid from said exchanger through the associated refrigerator component connected thereto.

3. A system according to claim 1 for airconditioning a space supplied by said supply-air ducts and exhausted by said spent-air ducts including bypass means to recirculate a given amount of spent air from the room by coupling the spent-air duct with the supply-air duct without passing through said heat exchangers.

4. A system according to claim 1 including means for introducing outside air into the spent-air duct upstream of the heat exchanger therein to increase the flow of air through the spent-air heat exchanger and effect an increase in the removal of heat from the fluid circuit.

5. In a ventilation installation comprising at least two heat exchangers, one disposed in the supply-air duct and the other disposed in the spent-air duct of the installation, fluid circuit means interconnecting said heat exchangers, said fluid circuit means including a refrigerating machine having an evaporator and a condenser, said machine, when operating, supplying heat to the fluid in said circuit by the condenser and withdrawing heat from the fluid in said circuit by the evaporator, pump means associated with each heat exchanger to effect circulation of the fluid in said fluid circuit means, and valves operable in one position to effect flow of fluid from one of the heat exchangers through the evaporator to the other of the heat exchangers and back to the first heat exchanger through the condenser, and operable in a second position to effect flow of fluid from the one heat exchanger through the evaporator and directly back to the one heat exchanger and to effect flow from the other heat exchanger through the condenser and back to the other heat exchanger directly; whereby when the valves are in the one position with the refrigerating machine inoperative, the pump means causes fluid flow which effects heat transfer between the spent air duct and the supply air duct and with the refrigerating machine operating, the fluid is heated in its flow from the spent-air duct to the supply-air duct and is cooled in its flow from the supply-air duct to the spent-air duct, and when the valves are in the second position the fluid in the supply-air heat exchanger is cooled by the refrigerating machine and the fluid in the spent-air heat exchanger is used to cool the refrigerating machine.

* * * * *